US012532961B2

(12) United States Patent
Balmer

(10) Patent No.: US 12,532,961 B2
(45) Date of Patent: Jan. 27, 2026

(54) PAINT BRUSH AND ROLLER WASHER

(71) Applicant: David A Balmer, Opelika, AL (US)

(72) Inventor: David A Balmer, Opelika, AL (US)

( * ) Notice: Subject to any disclaimer, the term of this patent is extended or adjusted under 35 U.S.C. 154(b) by 327 days.

(21) Appl. No.: 18/095,664

(22) Filed: Jan. 11, 2023

(65) Prior Publication Data

US 2023/0218075 A1 Jul. 13, 2023

Related U.S. Application Data

(60) Provisional application No. 63/298,344, filed on Jan. 11, 2022, provisional application No. 63/298,349, filed on Jan. 11, 2022.

(51) Int. Cl.
*A46B 17/06* (2006.01)
*B44D 3/00* (2006.01)

(52) U.S. Cl.
CPC .............. *A46B 17/06* (2013.01); *B44D 3/006* (2013.01)

(58) Field of Classification Search
CPC ................................ A46B 17/06; B44D 3/006
See application file for complete search history.

(56) References Cited

U.S. PATENT DOCUMENTS 2,985,178 A 5/1961 Christensen, Jr.
4,377,175 A 3/1983 Fritz
4,509,545 A 4/1985 Trotter
4,517,699 A 5/1985 Petricka
4,606,777 A 8/1986 Brow
4,641,673 A 2/1987 Conley et al.
4,832,066 A 5/1989 Shipman
4,928,402 A 5/1990 Allen
4,995,749 A 2/1991 Gornik
5,005,598 A 4/1991 Hodgdon
5,184,637 A 2/1993 Kowis
5,363,869 A 11/1994 McDowell
5,381,964 A 1/1995 Reyna
5,409,027 A 4/1995 Glunt
5,505,220 A 4/1996 Gorecki
6,463,943 B1 10/2002 Monroe
6,715,501 B2 4/2004 Pociask
6,779,535 B2 8/2004 Drukarov
7,383,847 B2 6/2008 Clark
7,640,941 B2 1/2010 Watters et al.
8,505,562 B2 8/2013 Mcphee, III
10,086,319 B1 10/2018 Suavet
(Continued)

FOREIGN PATENT DOCUMENTS

DE 202020003796 U1 10/2020

*Primary Examiner* — Michael E Barr
*Assistant Examiner* — Kevin G Lee
(74) *Attorney, Agent, or Firm* — Perilla Knox & Hildebrandt LLP; Stephanie Davy-Jow

(57) ABSTRACT

A paint applicator washer for washing paint applicators, such as for example paint brushes and paint rollers. The paint applicator washer includes at least one spray tube with a hose connector or adapter at one end thereof and at least one nozzle provided along the length of the at least one spray tube. When connected to a hose supplying washing fluid, such as for example water, the washing fluid is ejected from the at least one nozzle as a pressurized stream or jet which can be directed at used paint applicators to wash out paint and other debris therefrom.

10 Claims, 4 Drawing Sheets

(56) References Cited

U.S. PATENT DOCUMENTS

| | | | | |
|---|---|---|---|---|
| 2002/0050280 | A1* | 5/2002 | Brackett | B44D 3/006 134/6 |
| 2006/0000497 | A1 | 1/2006 | Searle | |
| 2006/0243309 | A1 | 11/2006 | Prescott | |
| 2008/0028556 | A1 | 2/2008 | Papenfuss | |
| 2008/0072932 | A1 | 3/2008 | Nicholas | |
| 2020/0023673 | A1 | 1/2020 | Lujan | |
| 2020/0390231 | A1 | 12/2020 | Rice | |

* cited by examiner

PAINT BRUSH AND ROLLER WASHER

CROSS-REFERENCE TO RELATED APPLICATION

This application claims the benefit of U.S. Provisional Patent Application Ser. No. 63/298,344 filed Jan. 11, 2022, and U.S. Provisional Patent Application Ser. No. 63/298,349, filed Jan. 11, 2022, the entireties of both are hereby incorporated herein by reference for all purposes.

TECHNICAL FIELD

The present invention relates generally to the field of cleaning apparatuses, and more particularly to apparatuses for cleaning and/or washing paint applicators.

BACKGROUND

Paint applicators such as for example paint brushes and paint rollers allow users to paint large areas more efficiently and effectively. However, the effectiveness of these paint applicators can degrade quickly if they are not properly cleaned and maintained. Particularly, improper care of paint brushes and paint rollers can lead to build-up of dried paint, dirt, and other residue which can lead to imperfect application of paint. Accordingly, it can be seen that needs exist for quickly and properly cleaning and maintaining used paint brushes and paint rollers. It is to the provision of apparatuses used to wash and clean paint brushes and paint rollers meeting these and other needs that the present invention is primarily directed.

SUMMARY

In example embodiments, the present invention provides an apparatus for washing paint applicators, such as for example paint brushes and paint rollers. The apparatus is generally configured to be fluidly connected to a hose supplying washing fluid, such as for example water. The washing apparatus generally includes a spray tube with a hose connector or adapter for releasably securing the washing apparatus to the hose. The spray tube includes one or more nozzles configured to direct and/or modify the flow characteristics, such as for example the rate of flow, speed, direction, shape, and/or the pressure of the washing fluid stream or jet dispersed or ejected from the spray tube.

In one aspect, the present invention relates to a paint applicator washer used to wash used paint applicators with a washing fluid supplied from a hose. The paint applicator washer includes a first spray tube extending between a first proximal end and a second distal end, one or more first nozzles provided along the first spray tube, a hose coupler for detachably connecting the first spray tube to the hose, and an end cap secured to a distal end of the spray tube, opposite the proximal end.

Optionally, the paint applicator washer further includes one or more bristle spreaders. The one or more bristle spreaders may comprise angled or pointed tips to help penetrate and spread apart the bristles. Moreover, the one or more bristle spreaders may be axially aligned to the one or more nozzles.

Optionally, the paint applicator washer may include a fluid flow control switch for controlling the flow of washing fluid from the hose.

Optionally, the paint applicator washer may include a second spray tube extending from the first, proximal end of the first spray tube in a direction substantially transverse to the first spray tube, the second spray tube extending between a first, proximal end and a second, distal end, wherein the first, proximal ends of the first and second spray tubes are adjacent one another. Additionally, the second spray tube may comprise one or more second nozzles. Additionally, the one or more first nozzles may be positioned adjacent the first, proximal end of the first spray tube and the one or more second nozzles may be positioned adjacent the second, distal end of the second spray tube.

Optionally, the paint applicator washer may further include a splash guard to minimize splatter/splashing of washed-out paint and/or washing fluid during use.

In another aspect, the invention relates to a washing attachment for a hose. The washing attachment includes a tubular main spray body with a hose coupler for fluidly connecting the main spray body to the hose, a plurality of nozzles aligned along a length of the tubular main spray body; and a plurality of bristle spreaders provided over the plurality of nozzles.

Preferably, the washing attachment includes four nozzles and four bristle spreaders. The bristles spreaders may have angled tips—preferably tips angled approximately 45 degrees.

In still another aspect, the invention relates to a paint applicator cleaner for use with a hose. The paint applicator cleaner includes a main tube extending between a first end and a second end, a hose coupler attached to the first end of the main tube, a first spray tube extending between a first end and a second end, and one or more first nozzles secured along the first spray tube. Preferably, the first end of the first spray tube is fluidly connected to the second end of the main tube. Preferably, each of the one or more first nozzles are surrounded by a tubular structure with a slanted tip.

Optionally, the paint applicator cleaner further includes a second spray tube extending between a first end and a second end, wherein the first end of the second spray tube is fluidly connected to the second end of the main tube. Additionally, the paint applicator cleaner may include one or more second nozzles secured along the second spray tube. Preferably, the one or more first nozzles are positioned adjacent the first end of the first spray tube and the one or more second nozzles are positioned adjacent the second end of the second spray tube.

Optionally, the paint applicator cleaner further includes a flow control switch or valve to control the flow of washing fluid from the hose.

Optionally, the paint applicator cleaner further includes a splash guard providing cover around the paint applicator during wash to minimize splashing and splatter of excess paint and washing fluid to the surrounding.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
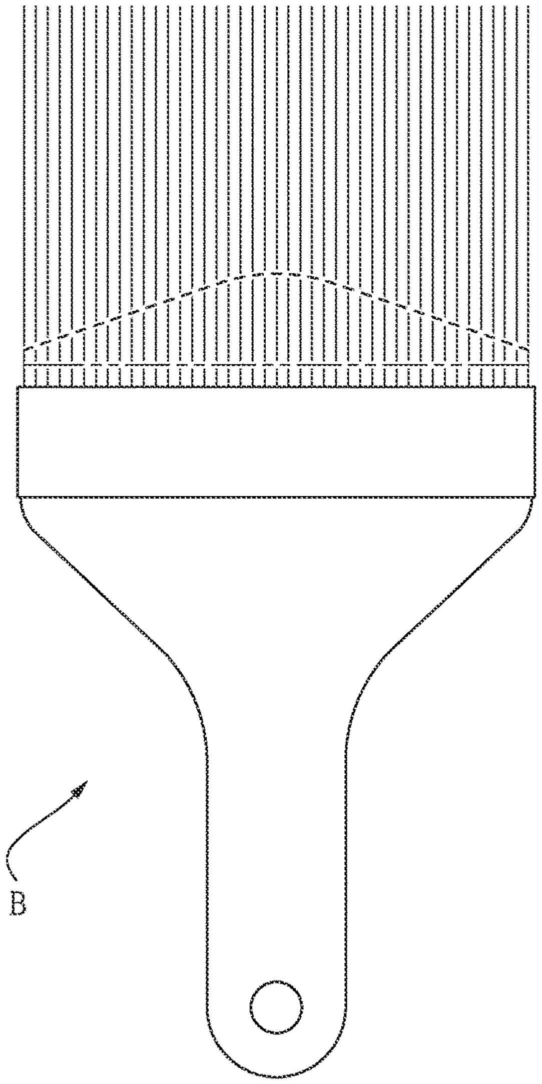
FIG. 1 shows flex lines of new and used paint brushes.

Painting apparatuses, such as for example paint brushes and paint rollers, are used to apply paint and other coating substances on surfaces efficiently and effectively. However, failure to properly clean the paint brushes and paint rollers after use can damage or deteriorate the quality of the apparatuses themselves and/or their functionality. Indeed, paint left on the brush bristles can harden and damage the fibers, discolor subsequent paint jobs, and/or lead to uneven application and finishes. For example, FIG. 1 shows a conventional paint brush B. If the paint brush is new or properly washed and maintained, the bristles flex or bend about the long-short-short dash line. However, if the brush is not washed and maintained properly, hardened paint, dirt, and other residues can particularly accumulate near the base of the brush head and inside the ferrule (i.e., where the bristles connect to the brush handle). This can cause the bristles to flex about the short dash line, which can negatively change how the brush functions/operates, cause the bristles to fling paint during use, and lead to frayed brush heads.

Similarly, paint rollers are also susceptible to issues if not properly washed and maintained after each use. For example, paint rollers typically include a roller cover attached to a paint roller frame. The roller cover typically includes a cylindrical core with an applicator material, such as for example pile fabric or foam rubber material, secured to the cylindrical core and is configured to absorb paint and transfer it to a surface to be painted. However, if the paint roller covers are not properly washed or maintained, paint hardens on the applicator material leading to uneven or blotchy application of paint on the painted surface. Therefore, it is helpful to properly wash paint applicators such as paint brushes and paint rollers after each use to help protect and keep the paint applicators functioning as intended. It is to the provision of paint applicator washers used to wash and clean paint applicators meeting these and other needs that the present invention is primarily directed.

Figure 2:
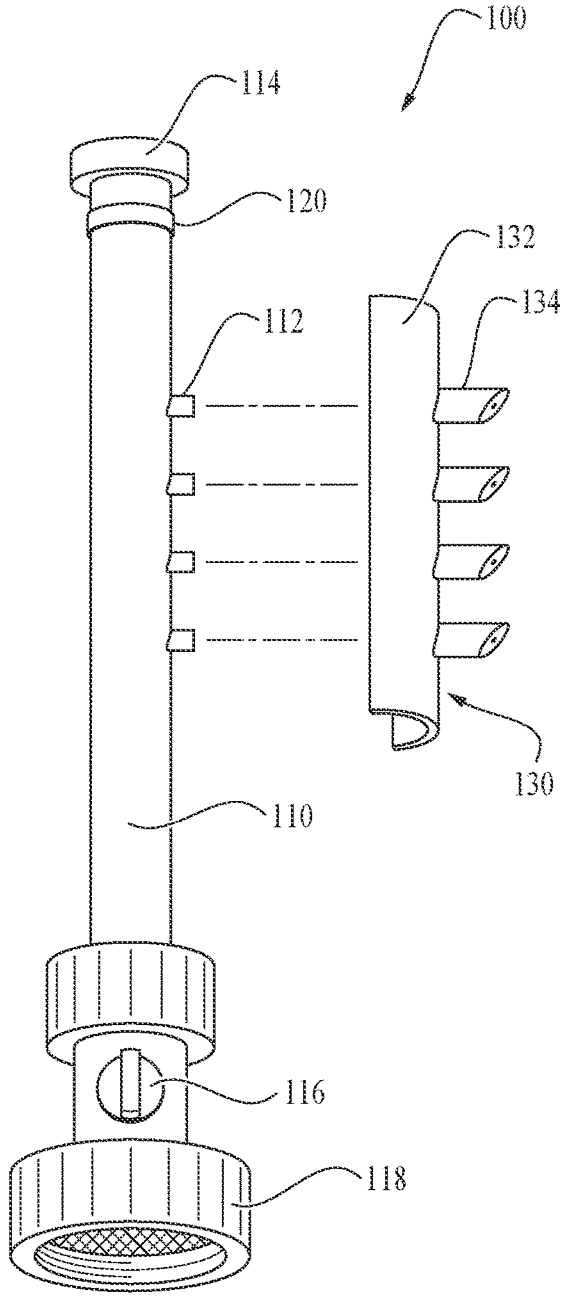
FIG. 2 is an exploded view of a paint brush washer according to an example embodiment of the present invention.
Figure 3:
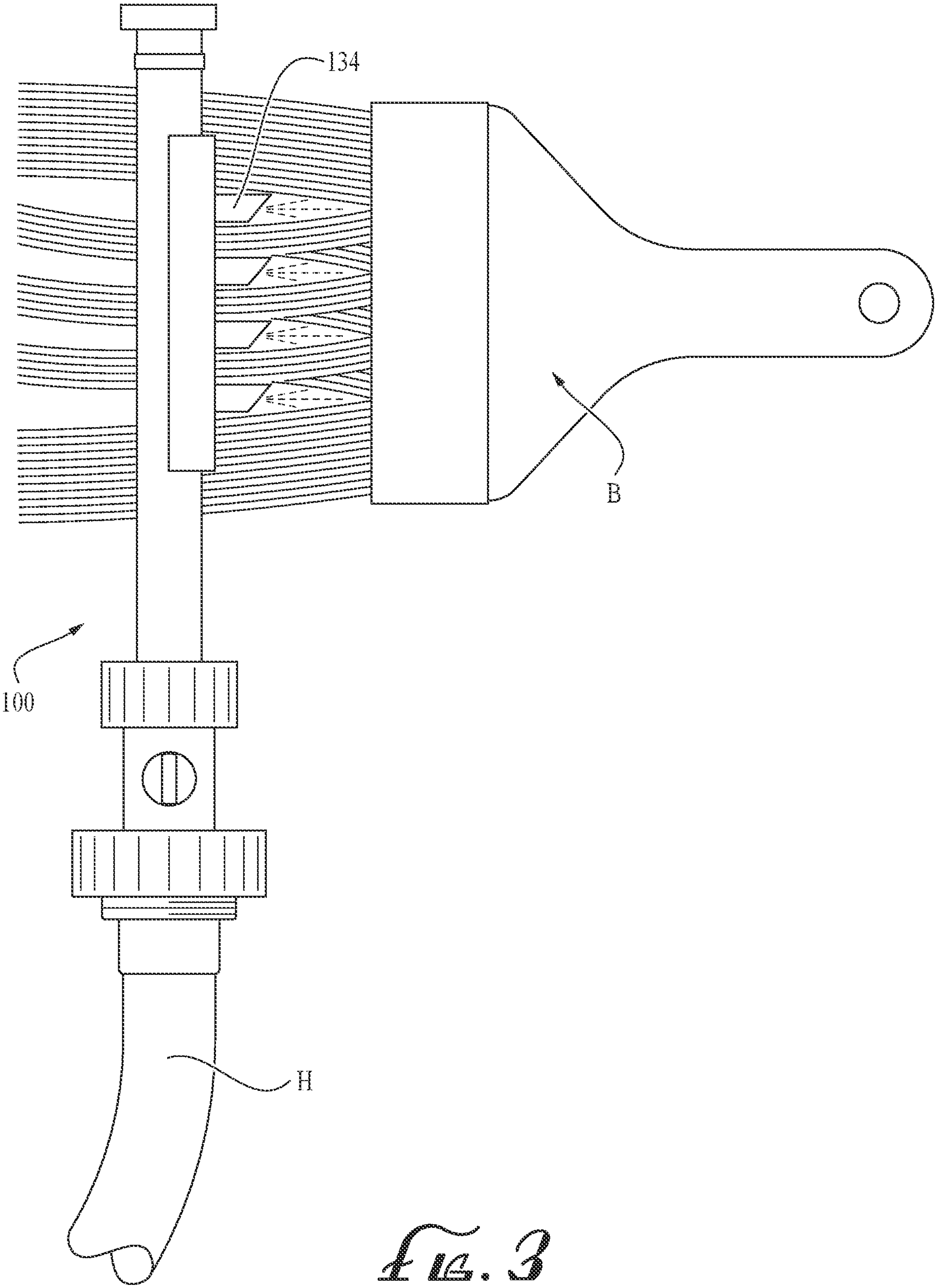
FIG. 3 shows use of the paint brush washer of FIG. 2 to clean a paint brush according to an example method of use.

With reference now to the drawing figures, wherein like reference numbers represent corresponding parts throughout the several views, FIGS. 2 and 3 show a paint brush washer 100 according to an example embodiment of the present invention. Generally, the paint brush washer 100 is configured for removable attachment or connection to a hose, such as for example a garden hose, to assist or ease washing out paint, or other applicable substances such as for example stains, lacquer, or oils, from used paint brushes B. Specifically, the paint brush washer 100 helps penetrate and spread apart the bristles so that pressurized washing fluid, such as for example water, air, or other cleaning agents, can be directed or guided towards the ferrule to remove and prevent accumulation of paint at the base of the bristles and inside the ferrule which can lead to impaired functionality of the affected paint brush as discussed above. In example embodiments, the paint brush washer measures between about 6 and 10 inches in length, or more preferably about 8 inches in length, and is preferably configured for hand-held operation. However, it will be appreciated by those skilled in the art that the length of the paint brush washer 100 may be shorter than 6 inches or longer than 10 inches.

As shown in FIGS. 2 and 3, the paint brush washer 100 includes a main spray tube 110. The spray tube 110 includes a hollow, tubular body having an exterior or outer wall and extending between a first, proximal end and a second, distal end. At the first, proximal end, the paint brush washer 100 includes a hose coupler or connector 118 configured to allow coupling and decoupling of the paint brush washer 100 from a hose H. In example embodiments, the spray tube 110 comprises a 0.5 inch diameter cross-linked polyethylene (PEX) pipe or tube and includes a threaded hose coupler 118 configured for removably securing the paint brush washer to a reciprocally threaded end of the hose H. Preferably, the hose coupler 118 further includes an operable flow control valve or switch 116 configured to control the flow of washing fluid from the hose to the spray tube 110. In some example embodiments, the hose coupler 118 may be configured to be tightened by hand and without the use of additional tools. In other example embodiments, the spray tube 110 may comprise other suitable materials and the brush washer may incorporate other suitable mechanisms or mechanical means known in the art for coupling the spray tube 110 to the hose H. Optionally, the hose coupler 118 may include fixed or removable filters or mesh liners to filter dirt and/or debris in the washing fluid from entering the paint brush washer 100 preventing clogs in the paint brush washer. Optionally, the hose coupler 118 may further include one or more elastic washers or gaskets to ensure a water-tight seal between the paint brush washer 100 and the hose H.

The second, distal end (generally opposite the first, proximal end) of the main spray tube 110 is closed or plugged. In example embodiments, for example, the paint brush washer 100 is provided with an end cap or plug 114 secured to the second, distal end of the main spray tube 110. According to example embodiments, the end cap 114 is friction-fitted or push-fitted in the open distal end of the spray tube 110 forming a closed end. In other example embodiments, the second, distal end of the spray tube 110 may otherwise be closed or blocked off by other suitable means. Optionally, the paint brush washer 100 may further include a locking ring 120 to help secure the end cap 114 to the spray tube 110.

Between the first, proximal and second, distal ends of the spray tube 110, the paint brush washer 100 includes one or more nozzles 112. The nozzles 112 are configured to direct and/or modify the flow characteristics, such as for example the rate of flow, speed, direction, shape, and/or the pressure of the washing fluid stream or jet dispersed or ejected from the spray tube 110. Preferably, the nozzles 112 are configured to produce a stream or jet of washing fluid with sufficient velocity and pressure to remove both dried and fresh paint, or other coating substances, from the paint brush bristles and ferrule without the need of additional scrubbing, scraping, brushing, and/or other cleaning methods. In example embodiments, the nozzles 112 are provided along a length of the spray tube 110 and spaced a predetermined distance apart from one another. In the depicted embodiment, for example, the spray tube 110 includes four nozzles 112 spaced about 0.2-1.0 inches apart from one another, preferably about 0.3-0.75 inches apart from one another, or more preferably about 0.4 inches apart from one another. Optionally, the nozzles may be adjustable to modify certain characteristics such as for example the rate of flow, speed, direction, shape, and/or the pressure of the jet or stream of washing fluid ejected from the nozzles.

As shown in FIG. 2, the brush washer 100 further includes a bristle spreader assembly 130 including one or more bristle spreaders 134 secured to a base plate or cover 132. In example embodiments, the bristle spreaders 134 are tubular and are axially aligned to the nozzles 112. Preferably, the bristle spreaders 134 are aligned to the nozzles 112 so that washing fluid jet discharged from the corresponding nozzles are not impeded by the bristle spreaders 134. The bristle spreaders 134 comprise angled or pointed tips which help penetrate and spread the bristles apart during use, as shown in FIG. 3. Specifically, spreading the bristles apart allows the water jets (indicated by the dashed lines in FIG. 3) to be expressly directed or guided towards the base of the brush head and the ferrule. In the depicted embodiment, for example, the exposed or free ends of the bristle spreaders comprise an angled tip at approximately 45-degree angle to create a sharp tip to penetrate and spread the bristles apart during use. In preferred embodiments, the bristle spreader assembly 130 is permanently affixed to the spray tube 110. In other example embodiments, the bristle assembly 130 may be configured for removable attachment to the spray tube 110 by for example snap fit coupling and/or other mechanical coupling means.

In example modes of use, the paint brush washer 100 is fluidly connected to the hose H, such as for example a garden hose, via hose connector 118. The hose supplies pressurized washing fluid, such as for example pressurized water, to the spray tube 110 whereby the pressurized fluid is discharged from the spray nozzles 112. Generally, the spray nozzles 112 are configured to produce pressurized jets of washing fluid with sufficient velocity and pressure to wash off fresh, and if applicable dried, paint from the bristles and ferrule. As shown in FIG. 3, the pointed tips of the bristle spreaders 134 are used to penetrate between the bristles and spread the bristles apart whereby the pressurized jets of washing fluid can be directed to the base of the brush head and ferrule to dislodge and/or wash-out dried paint and other debris therefrom. The paint brush washer 100 may further be used in a brushing/combing manner to further dislodge and/or wash-out dried paint from the bristles or spread apart bristles clumped together by for example dried paint. Moreover, when provided, the flow control switch 116 can be used to control the flow and supply of pressurized washing fluid from the hose H to the spray tube 110 and thereby the flow characteristics of the washing fluid discharged through the spray nozzles 112. For example, the flow control switch 116 may be used to completely shut off the supply of washing fluid to the paint brush washer 100 or to reduce/increase for example the velocity or pressure of the washing fluid exerted from the nozzles 112.

Figure 4:
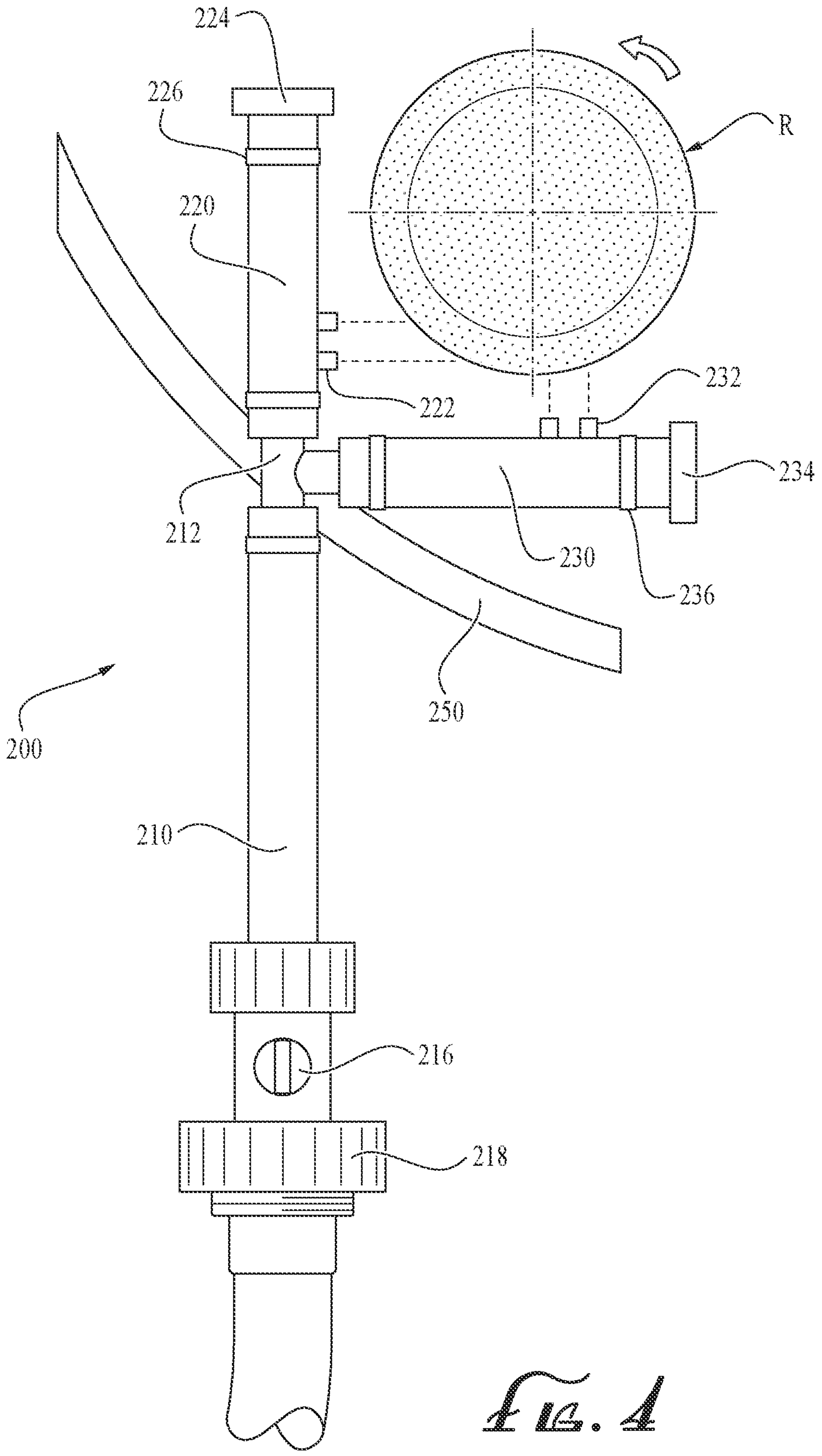
FIG. 4 shows a paint roller washer according to another example embodiment of the present invention.

FIG. 4 shows a paint roller washer 200 according to an example embodiment of the present invention. Generally, the paint roller washer 100 is configured for removable attachment or connection to a hose, such as for example a garden hose, to assist or ease washing out paint, or other applicable substances, from used paint rollers R. In example embodiments, the paint roller washer 200 includes a main tube 210 extending between a first, proximal end and a second, distal end (generally opposite the first, proximal end). At the first, proximal end, the paint roller washer 200 includes a hose coupler or connector 218 configured for, for example, threaded connection to a hose for supplying washing fluid. Optionally, the paint roller washer 200 may be provided with a flow control valve or switch 216 to control the supply of washing fluid supplied to the paint roller washer 200.

In example embodiments, the paint roller washer 200 includes a plurality spray tubes fluidly connected to the main tube by a tee fitting or splitter 212. In the depicted embodiment, for example, the paint roller washer 200 includes a first spray tube 220 extending from the splitter 212 in a direction substantially longitudinal or parallel to the main tube 210 and a second spray tube 230 extending from the splitter 212 and substantially transverse to main tube 210. As shown in FIG. 4, the first spray tube 220 is fluidly connected to the splitter 212 at a first, proximal end of the first spray tube. The second, distal end (generally opposite the first, proximal end) of the first spray tube 220 is closed or plugged for example with a first end cap or plug 224. Similarly, the second spray tube 230 is fluidly connected to the splitter 212 at a first, proximal end of the second spray tube. The second, distal end (generally opposite the first, proximal end) of the second spray tube 220 is closed or plugged for example with a second end cap or plug 234.

As shown in FIG. 4, the first and second spray tubes 220, 230 further include nozzles 222 and 232, respectively. In example embodiments, the paint brush washer 100 includes one or more first nozzles 222 between the first, proximal and second, distal ends of the first spray tube 220 and one or more second nozzles 232 provided between the first, proximal and second, distal ends of the second spray tube 230. Generally, the first and second nozzles 222, 232 are configured to direct and/or modify the flow characteristics, such as for example the rate of flow, speed, direction, shape, and/or the pressure of the washing fluid stream or jet dispersed or ejected from the spray tubes 220 and 230. Preferably, the nozzles 222 and 232 produce a stream or jet of washing fluid with sufficient velocity and pressure to remove both dried and fresh paint, or other coating substances, from the paint roller cover (e.g., the fabric pile or foam portions) without the need of additional scrubbing, scraping, brushing, and/or other cleaning methods. In example embodiments, the nozzles 222 and 232 are provided along the length of the first and second spray tubes 220, 230 and are spaced a predetermined distance apart from one another. In the depicted embodiment, for example, the spray tubes 220 and 230 include a pair of first nozzles 222 and a pair of second nozzles 232, respectively. Each pair of nozzles are spaced about 0.2-1.0 inches apart from one another, preferably about 0.3-0.75 inches apart from one another, or more preferably about 0.4 inches apart from one another. Optionally, the nozzles may be adjustable to modify certain characteristics such as for example the rate of flow, speed, direction, shape, and/or the pressure of the jet or stream of washing fluid ejected from the nozzles.

The first and second nozzles 222, 232 are preferably arranged in a manner or arrangement such that the nozzles are offset from the center of the first and second spray tubes 220, 230 respectively. For example, as shown in FIG. 4, the first nozzles 222 are positioned closer to the first, proximal end of the first spray tube 220 and the second nozzles 323 are positioned closer the second, distal end of the second spray tube 230. In other words, the first nozzles 222 are positioned a first distance from the splitter 212 and the second nozzles are positioned a second distance greater than the first distance from the splitter 212. Alternatively, the position of the first and second nozzles 222, 232 may be reversed wherein the first nozzles 222 are positioned a first distance from the splitter 212 and the second nozzles are positioned a second distance lesser than the first distance from the splitter 212.

In example modes of use, the paint roller washer 200 is fluidly connected to a hose, such as for example a garden hose, via hose connector 218. The hose supplies pressurized washing fluid, such as for example pressurized water, to the main tube 210, first spray tube 220, and second spray tube 230 whereby the pressurized fluid is discharged from the first and second spray nozzles 222, 223. Generally, the spray nozzles 222, 232 are configured to produce pressurized jets of washing fluid with sufficient velocity and pressure to wash off fresh, and if applicable dried, paint from the roller cover material. As shown in FIG. 4, the first and second nozzles 222, 232 are offset from the centers of the first and second spray tubes 220, 230. Accordingly, the jets of washing fluid from nozzles 222 and 232 (as indicated by dashed lines) are exerted on the roller cover surface offset from the axial center thereof causing the roller cover to spin. For example, with the first nozzles positioned near the first, proximal end of the first spray tube 220 and the second nozzles positioned near the second, distal end of the second spray tube 230, the washing fluid jets from the nozzles cause the roller cover to spin in a counter-clockwise direction as indicated by the arrow in FIG. 4. Alternatively, if the first nozzles are positioned near the second, distal end of the first spray tube 220 and the second nozzles are positioned near the first, proximal end of the second spray tube 230, the washing fluid jets from the nozzles cause the roller cover to spin in an opposite, clockwise direction.

Optionally, the flow control switch 216 can be used to control the flow and supply of pressurized washing fluid from the hose H to the spray tubes 220 and 230 and the flow characteristics of the washing fluid discharged through the spray nozzles 222 and 232. For example, the flow control switch 116 may be used to completely shut off the supply of washing fluid to the paint brush washer 200 or to reduce/increase for example the velocity or pressure of the washing fluid exerted from the nozzles 222, 232.

In preferred modes of use, the pressurize jets of washing fluids exert sufficient velocity and pressure to (1) loosen and remove paint applied or embedded in the applicator material of the roller cover and (2) cause the roller cover to rotate at high speeds to remove excess paint and/or excess washing fluid by centrifugal force. Preferably, the paint roller washer 200 is moved back and forth longitudinally along the length of the roller cover to ensure the paint roller is fully washed.

Optionally, the paint roller washer 200 may further include a splash guard 250 secured to the main tube 210 to help contain and shields against excess splatter from the spinning roller cover during use.

Figure 5:
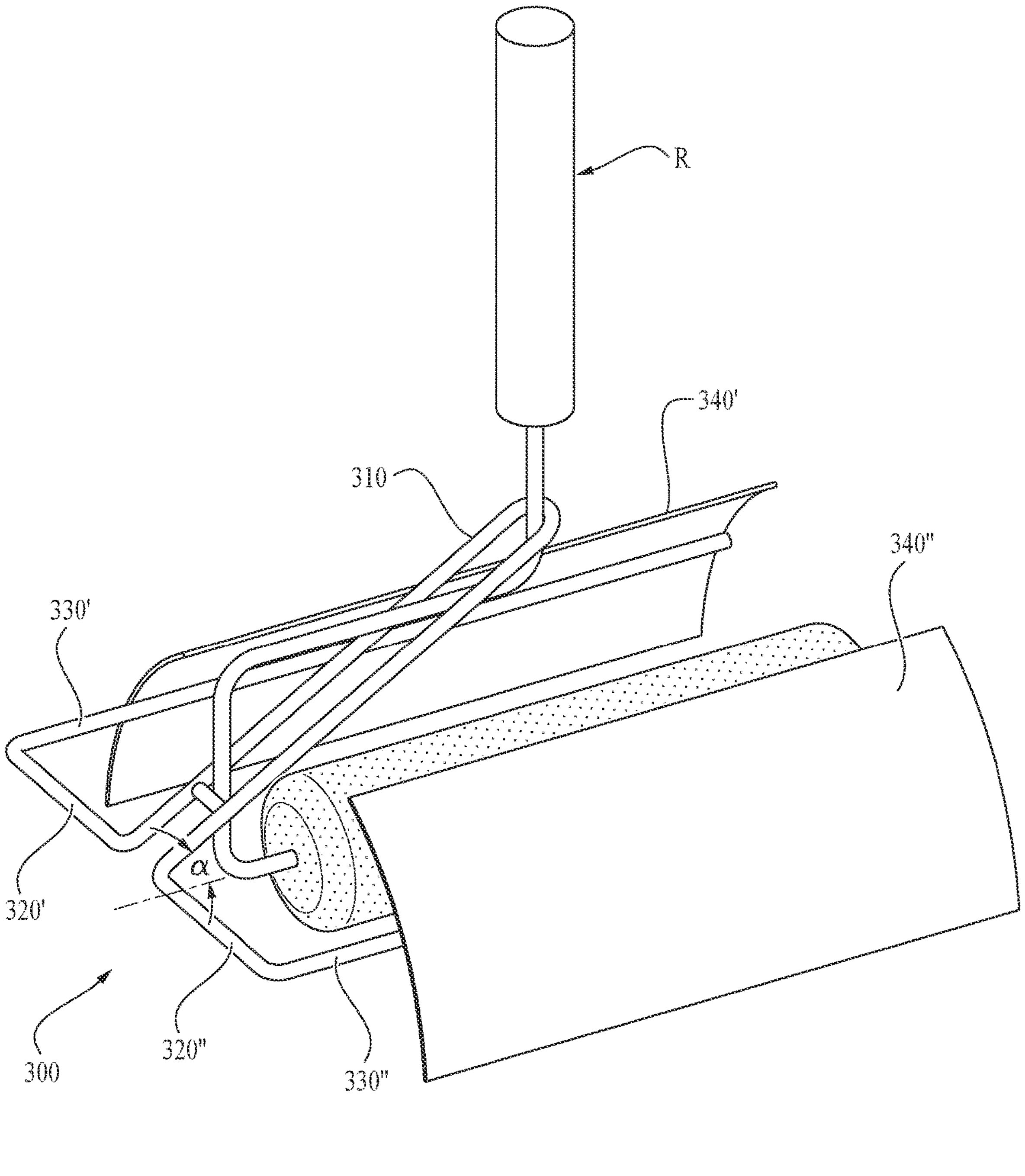
FIG. 5 shows a paint roller splash guard coupled to a paint roller according to yet another example embodiment of the present invention.

FIG. 5 shows a paint roller splash guard attachment 300 configured for use with paint rollers. Generally, the splash guard attachment 300 further helps contain and prevent splatter of washing fluid and excess paint as the paint roller cover is washed using the paint roller washer 200. In example embodiments, the paint roller splash guard attachment 300 is configured to be secured to the paint roller wire frame or body as shown in FIG. 5. The splash guard attachment 300 comprises a W-shaped wire frame including a U-shaped securing portion 310, lateral extensions portions 320' and 320", and longitudinal extension portions 330' and 330". The splash guard attachment 300 further includes arcuate splash guards 340' and 340" secured to the longitudinal frame portions 330' and 330", respectively. In preferred modes of use, the splash guard attachment 330 is secured to the paint roller so that the splash guards 340' and 340" are generally coaxially aligned to the roller cover. In example embodiments, the U-shaped securing portion 310 is raised at angle $\alpha$ relative to the plane defined by the longitudinal and lateral extension portions. In example modes of use, the paint roller splash guard attachment 300 is slipped over the wire frame body of the paint roller wherein the wire frame body of the paint roller is secured between two elongated sides of the U-shaped securing portion 310. According to example modes of use, the splash guards 340', 340", and 250 provide almost 360 degrees of splash protection around the roller cover while washing the paint roller.

While the invention has been described with reference to example embodiments, it will be understood by those skilled in the art that a variety of modifications, additions and deletions are within the scope of the invention, as defined by the following claims.

What is claimed is:

1. A paint applicator washer for washing a paint applicator with a washing fluid supplied from a hose, the paint applicator washer comprising:

a first spray tube extending between a first proximal end and a second distal end;

one or more first pressurized nozzles provided along the first spray tube, wherein the one or more first pressurized nozzles are perpendicular to a direction of water flow from the first proximal end to the second distal end;

a second spray tube extending from the first, proximal end of the first spray tube in a direction substantially transverse to the first spray tube, the second spray tube extending between a first, proximal end and a second, distal end, wherein the first, proximal ends of the first and second spray tubes meet at a junction, wherein the second spray tube comprises one or more second nozzles along a body of the spray tube, the second nozzles being oriented parallel to the first spray tube, wherein the one or more first nozzles are offset from a center of the body of the first spray tube by a first distance from the junction and the one or more second nozzles are offset from a center of a body of the second spray tube by a second distance from the junction different from the first distance, and wherein the one or more first nozzles and the one or more second nozzles are configured to direct water flow offset from an axial center of a roller to cause the roller to spin when placed between the first and second spray tubes;

a hose coupler at the proximal end for detachable connection to the hose, and an end cap secured to a distal end of the spray tube, opposite the proximal end.

2. The paint applicator washer of claim 1, further comprising one or more bristle spreaders.

3. The paint applicator washer of claim 2, wherein the one or more bristle spreaders comprise angled tips relative to a main axis of the bristle spreader.

4. The paint applicator washer of claim 2, wherein the one or more bristle spreaders are axially aligned to the one or more nozzles.

5. The paint applicator washer of claim 1, further comprising a fluid flow control switch at the proximal end.

6. The paint applicator washer of claim 1, further comprising a splash guard.

7. A paint applicator cleaner for use with a hose, the paint applicator cleaner comprising:

a main tube extending between a first end and a second end, a hose coupler attached to the first end of the main tube;

a first spray tube extending between a first end and a second end, wherein the first end of the first spray tube is fluidly connected to the second end of the main tube;

two or more first nozzles secured along a body of the first spray tube, wherein the one or more first nozzles are perpendicular to a direction of water flow from the first end to the second end;

a second spray tube extending between a first end and a second end, wherein the first end of the second spray tube is fluidly connected to the second end of the main tube via a splitter and wherein the second spray tube is transverse to the first spray tube; and two or more second nozzles secured along a body of the second spray tube, the second nozzles being oriented parallel to the first spray tube, wherein the two or more first nozzles are offset from a center of the body of the first spray tube by a first distance from the splitter and the two or more second nozzles are offset from a center of a body by a second distance from the splitter different from the first distance, wherein the nozzles are configured to direct water flow offset from an axial center of a roller to cause the roller to spin when placed between the first and second spray tubes.

8. The paint applicator cleaner of claim 7, further comprising a flow control switch configured to control water flow to the device from a hose coupled to the hose coupler.

9. The paint applicator cleaner of claim 7, further comprising a splash guard.

10. The paint applicator cleaner of claim 7, wherein each of the two or more first nozzles are surrounded by a tubular structure with a slanted tip.

* * * * *